United States Patent
Celiesius

(10) Patent No.: US 11,386,194 B1
(45) Date of Patent: Jul. 12, 2022

(54) GENERATING AND VALIDATING ACTIVATION CODES WITHOUT DATA PERSISTENCE

(71) Applicant: Oversec, UAB, Vilnius (LT)

(72) Inventor: Kazimieras Celiesius, Vilnius (LT)

(73) Assignee: Oversec, UAB, Vilnius (LT)

( * ) Notice: Subject to any disclaimer, the term of this patent is extended or adjusted under 35 U.S.C. 154(b) by 0 days.

(21) Appl. No.: 17/372,393

(22) Filed: Jul. 9, 2021

(51) Int. Cl.
| | | |
|---|---|---|
| G06F 21/44 | (2013.01) | |
| G06F 21/42 | (2013.01) | |
| H04L 9/06 | (2006.01) | |
| H04L 9/40 | (2022.01) | |
| G06F 21/31 | (2013.01) | |

(52) U.S. Cl.
CPC ............ *G06F 21/44* (2013.01); *H04L 9/0643* (2013.01); *H04L 63/0876* (2013.01); *G06F 21/31* (2013.01); *G06F 2221/2129* (2013.01); *H04L 2463/121* (2013.01)

(58) Field of Classification Search
None
See application file for complete search history.

(56) References Cited

U.S. PATENT DOCUMENTS

| | | | | |
|---|---|---|---|---|
| 10,785,021 B1* | 9/2020 | Prabhat | ................. | H04L 9/3213 |
| 10,826,702 B2* | 11/2020 | Gordon | ................... | H04L 9/321 |
| 2007/0150744 A1* | 6/2007 | Cheng | ................... | G06F 21/335 |
| | | | | 713/183 |
| 2008/0289025 A1* | 11/2008 | Schneider | ............. | H04L 63/123 |
| | | | | 726/10 |
| 2013/0268444 A1* | 10/2013 | Namgoong | ......... | H04L 63/0838 |
| | | | | 705/71 |
| 2014/0129834 A1* | 5/2014 | Brill | ........................ | H04L 9/321 |
| | | | | 713/168 |
| 2016/0328707 A1* | 11/2016 | Wagner | ................ | G06Q 20/401 |
| 2017/0013012 A1* | 1/2017 | Hansen | ................... | G06F 21/31 |
| 2017/0346829 A1* | 11/2017 | Gordon | ................ | H04L 63/102 |
| 2019/0188706 A1* | 6/2019 | McCurtis | ............... | G06Q 20/02 |
| 2020/0013026 A1* | 1/2020 | Noonan | ............. | G06Q 20/0658 |
| 2020/0092272 A1* | 3/2020 | Eisen | ................... | G06Q 20/385 |
| 2020/0250664 A1* | 8/2020 | Kumar | .................. | H04L 63/083 |
| 2021/0120417 A1* | 4/2021 | Sundar | .................... | H04L 63/08 |
| 2021/0304200 A1* | 9/2021 | Doney | ................... | G06Q 20/36 |

(Continued)

FOREIGN PATENT DOCUMENTS

WO    WO-2007071191 A1 *   6/2007   ........... G06F 21/335

OTHER PUBLICATIONS

Mobile—Based Multi-Factor Authentication Scheme for Mobile Banking. Handson. (Year: 2016).*

(Continued)

*Primary Examiner* — Venkat Perungavoor
(74) *Attorney, Agent, or Firm* — Young Basile Hanlon & MacFarlane, P.C.

(57) ABSTRACT

The current embodiments offer a method to generate, send, and authenticate users through validations codes without the need for data retention. Codes are generated each time they are sent and received based on original and identifiable inputs. They are then compared to authenticate a user. Eliminating the need for data retention or persistence removes the risks associated with keeping data on the service provider's storage as can be maliciously accessed.

17 Claims, 4 Drawing Sheets

(56) References Cited

U.S. PATENT DOCUMENTS

2021/0314678 A1* 10/2021 Stamatakis ......... H04L 41/0809

OTHER PUBLICATIONS

Secure Annihilation of Out-of-Band Authorization for Online Transactions. Hussain. (Year: 2018).*
Smart Locker: IOT based Intelligent Locker with Password Protection and Face Detection Approach. Mostakim. (Year: 2019).*
Design and Implementation of a Multifactor Authentication System In ATM Security. Olatunji (Year: 2016).*
iPay.lk—A Digital Merchant Platform from Sri Lanka. Pathirana. Springer. (Year: 2018).*
Improved Secure Network Authentication Protocol (ISNAP) for IEEE 802.16. Hashmi. IEEE. (Year: 2009).*
An Efficient Lightweight Key Agreement and Authentication Scheme for WBAN. Rehman. IEEE. (Year: 2020).*

* cited by examiner

GENERATING AND VALIDATING ACTIVATION CODES WITHOUT DATA PERSISTENCE

FIELD

The disclosure belongs to the area of account authentication without credential storage. More specifically, the disclosures present an efficient way to account authentication through hashing algorithms without data persistence.

BACKGROUND

In order to provide services to users, service providers must be able to identify those users. This process is usually called user authentication. One of the main ways to perform authentication of a user is via a username and password.

Many federated identity management systems within which digital identity credentials maintained by one organization could be used to gain access to another system are commonplace. For example, if a website allows its users to log in to access restricted content or services using the user ID and password issued by another website, then both websites and their users are participating in a "federated identity management system." The term sign-in-wrap describes the use of user ID and password digital identity credentials as a method for manifesting intent to be bound to a contract with a website operator.

Security objectives in handling user authentication involve availability, authentication, confidentiality, nonrepudiation, and integrity. Availability refers to the idea that access to the Internet should be available and reliable to all users. Authentication usually involves using a username and password to validate the identity of the user. Confidentiality ensures that information on the Internet is restricted to authorized users. Nonrepudiation is an assurance of the responsibility for an action. Integrity ensures that data, devices, and processes are free from tampering.

Allowing users to sign in via a username and password credentials means that the service provider is not reliant on the status of third-party identity providers for your users to access their system. For customer facing applications, OpenID Connect (OIDC) is the most frequently used industry standard protocol.

However, username and password based user authentication falls into phishing risks. Phishing schemes have several methods that can contribute to identity theft. One of the most common types of phishing scams tricks users into entering their information into a fake website that has been made to mimic another trusted site. For example, phishing websites may be designed to look like a social media website login page, a bank's website, or even search engines and email login pages. Once users are redirected to the fake site through a hacked or malicious website, any information that they enter thinking that they are on the well-known, trustworthy site becomes compromised. Sometimes, fake websites are created and incorporated into search engines, encouraging people to apply for jobs with, or make purchases from, fake companies. Malware, cookies, and potentially malicious programs installed on computers without users' knowledge can log information for long periods of time, including passwords and personal messages.

Keylogger Trojans capture keystrokes and mouse movements in the background without users having any knowledge of this activity. Keylogger malware can be used to gain access to passwords and other personal information while users have no idea this is taking place. Like all Trojan horse malware, keylogger malware can wait in the background for events such as users opening bank account login pages before executing the functions of recording and transmitting keystrokes to its master.

The issue of user authentication translates into the field of Internet of Things (IoT). IoT describes the network of physical objects—"things" or objects—that are embedded with sensors, software, and other technologies for the purpose of connecting and exchanging data with other devices and systems over the Internet. A major issue with IoT devices is that due to their implementation of default passwords, which may be known to hackers, many devices have pre installed unchangeable passwords. Only a few IoT manufacturers are considering the particular forms of cryptographic algorithms and models needed for IoT devices. In addition, these connected devices have a limited memory size, limited battery life, and restricted processors.

To tackle some of these problems, service providers sometimes offer authentication codes that certify that a user has access to the credited email address or a phone number. However, this requires data retention and creates additional vulnerabilities in cases of data leaks or breaches.

The current embodiments offer a method to generate, send, and authenticate users through validations codes without the need for data retention. Eliminating the need for data retention or persistence removes the risks associated with keeping data on the service provider's storage as storage can be maliciously accessed.

SUMMARY

To address security concerns with traditional user authentication, the current embodiments offer a method to authenticate users via emailing a payload that is sufficiently difficult to guess, however easy for a user to handle manually.

The proposed method also enables a service provider to generate and authenticate codes without storing them in a database, thus without data retention or persistence.

DETAILED DESCRIPTION

Figure 1:
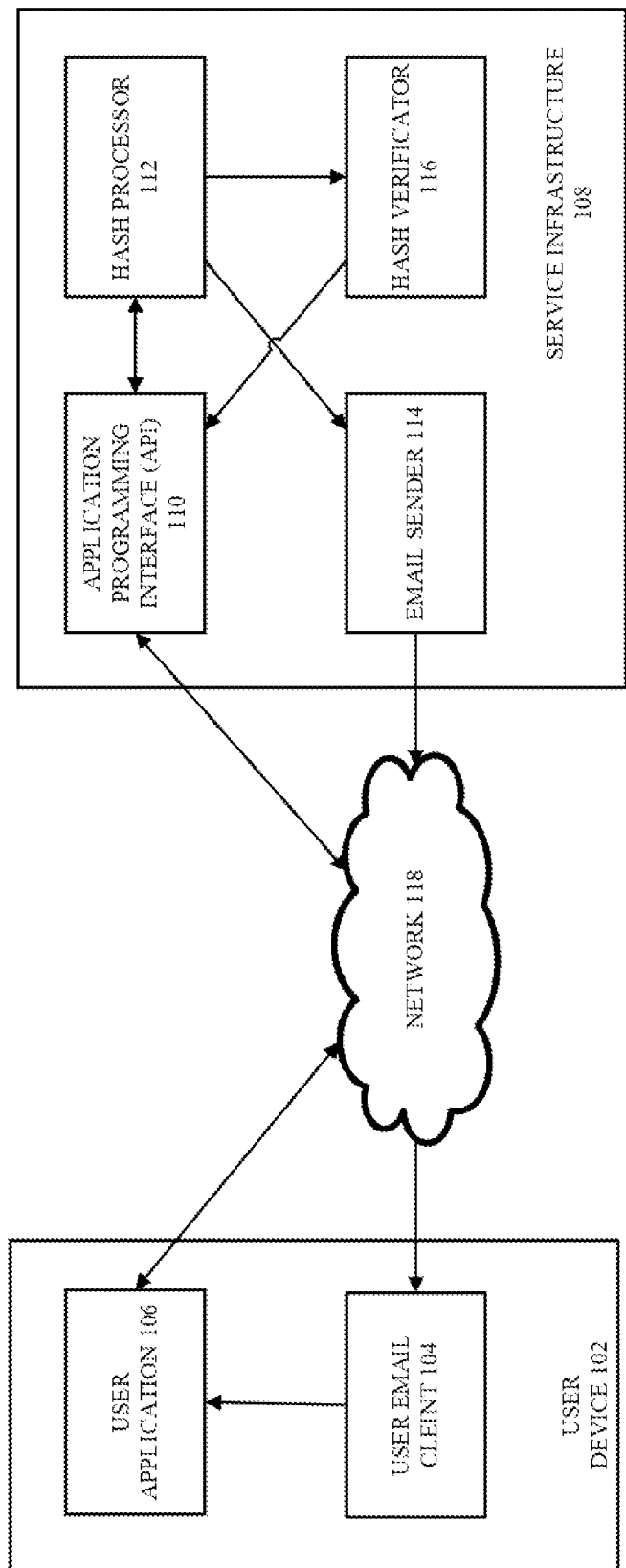
FIG. 1 shows a block diagram of an exemplary architectural depiction of components.

Some general terminology descriptions may be helpful and are included herein for convenience and are intended to be interpreted in the broadest possible interpretation. Elements that are not imperatively defined in the description should have the meaning as would be understood by the person skilled in the art.

User Device 102—a user device can be any suitable user computing device including, but not limited to, a smartphone, a tablet computing device, a personal computing device, a laptop computing device, a gaming device, a vehicle infotainment device, a smart appliance (e.g., smart refrigerator or smart television), a cloud server, a mainframe, a notebook, a desktop, a workstation, a mobile device, or any other electronic device used for connecting to Service Infrastructure 108. It can also include multiple devices connected to the same network or communication media, like the Internet. User Device 102 is represented by a singular device but can consist of multiple devices operable with the same credentials or identifiers owned by a user.

User Email Client 104—a software application operable on User Device 102 that is able to receive email messages from the service provider. Most commonly used email protocols on the internet are Post Office Protocol (POP3), Internet Message Access Protocol (IMAP), and Simple Mail Transfer Protocol (SMTP). The embodiments are not limited by whichever protocol is used to transfer email messages.

User Application 106—a software application operable on User Device 102 that communicates with API 110 on Service Infrastructure 108. Additionally, User Application 106 can perform any task that is related to the main operation or service of the service provider for which a user needs to be authenticated. In some embodiments, User Email Client 104 and User Application 106 can be on different devices associated with a single user, so that information can be received in one device and entered on another device.

Service Infrastructure 108 or service provider server 108—an overall structure of the service provider that seeks to authenticate User Device 102. The types of services provided are not limited by the embodiments. The ontology and mereology of the components in Service Infrastructure 108 is also not strict and different components can be combined into a single hardware, software infrastructure to form a single logical unit or can also be combined into a single logical unit on a cloud.

API 110—service provider infrastructure component providing a collection of service endpoints exposing the functionality necessary for customers to authenticate with a service provider, as well as to obtain the prerequisites necessary for establishing a connection to a server.

Hash Processor 112—a processing unit that is able to execute a hash algorithm. A hash algorithm is a function that converts two concatenated strings of characters into a third string in such a way that the conversion is not reversible and the former cannot be deduced from the latter but the resulting hashed value is unique to the inputs. The output string is generally much smaller than the original data. Hash algorithms are meant to be collision-resistant, meaning that there is a very low probability that the same resultant string would be created for different data Hash Verificator 114—a processing unit that is able to compare two hash values. In one embodiment, a received hash value is compared to a new hash value produced by Hash Processor 112. It must be emphasized that elements like Hash Processor 112 and Hash Verificator 114 can be combined into a single hardware or software unit that is capable of both operations as described. However, they are described as different elements for functional clarity.

Mail Sender 114—a software component with access to Network 118 that is able to send email messages via conventional email communication protocols to User Device 102. The format of email messages can be partly predefined and a newly generated code is inserted and the message is sent to User Device 102.

Network 118—a digital telecommunications network that allows network-attached nodes to communicate as well as share and consume resources. Examples of a network are local-area networks (LANs), wide-area networks (WANs), campus-area networks (CANs), metropolitan-area networks (MANS), home-area networks (HANs), Intranet, Extranet, Internetwork, or Internet. However, the email protocols as described above are optimized for using the Internet as the preferred network.

The present embodiments now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 shows an exemplary overall architecture of the current embodiment that comprises of User Device 102, which can be any computing or a networking device (e.g., a personal computer, mobile phone, a tablet computer, router, smart home device) having access (e.g. Internet connection) to a particular network, User Email Client 104 and User Application 106 contained in User Device 102, API 110, Hash Processor 112, Mail Sender 114, and Hash Verificator 116 contained in Service infrastructure 108.

Different embodiments can have additional components, required for additional actions. For example, more than one and usually more than 100 or more than 1000 or 10000 user devices can be connected to a primary server simultaneously. There can be additional internal components contained in all elements but the description of them has been skipped for clarity since they are not relevant to current embodiments.

Both User Device 102 and Service Infrastructure 108 have access to Network 118 and are able to interact with each other through it. Here, Network 118 can be any digital telecommunication network that permits several nodes to share and access resources, e.g. local-area network (LAN), wide-area networks (WANs), campus-area networks (CANS), metropolitan-area networks (MANs), home-area networks (HANs), Intranet, Extranet, Internetwork, Internet.

While the elements shown in the FIG. 1 implement the exemplary embodiment, some elements in other embodiments can have different titles or can be combined into a single element instead of two separate elements (for example, Hash Processor 112 and Hash Verificator 116 can be combined into a single hardware, software infrastructure to form a single logical unit or can also be combined into a single logical unit on a cloud. However, the functionality of elements and the flow of information between the elements is not impacted generally by such combinations or consolidations. Therefore, FIG. 1 as shown should be interpreted as exemplary only, and not restrictive or exclusionary of other features, including features discussed in other areas of this disclosure here within. The infrastructure shown here is represented as to reveal the logical structure and technological action flow of the embodiments.

A current state of the art information flow would generally consist of User Device 102 masking an authentication request with API 110 over Network 118. As part of the authentication request, User Device 102 would send a combination of username and password (which can be encrypted or unencrypted). An element of Service Infrastructure 108, for example, Hash Verificator 116, would compare the username and password combination with one that is stored in a service provider database and either allow or deny authentication.

The following detailed description of figures will show how the embodiments disclosed herein improve upon the state of the art functionality. The main focus of the improvements is to authenticate users through email verification codes without data retention or persistence.

Figure 2:
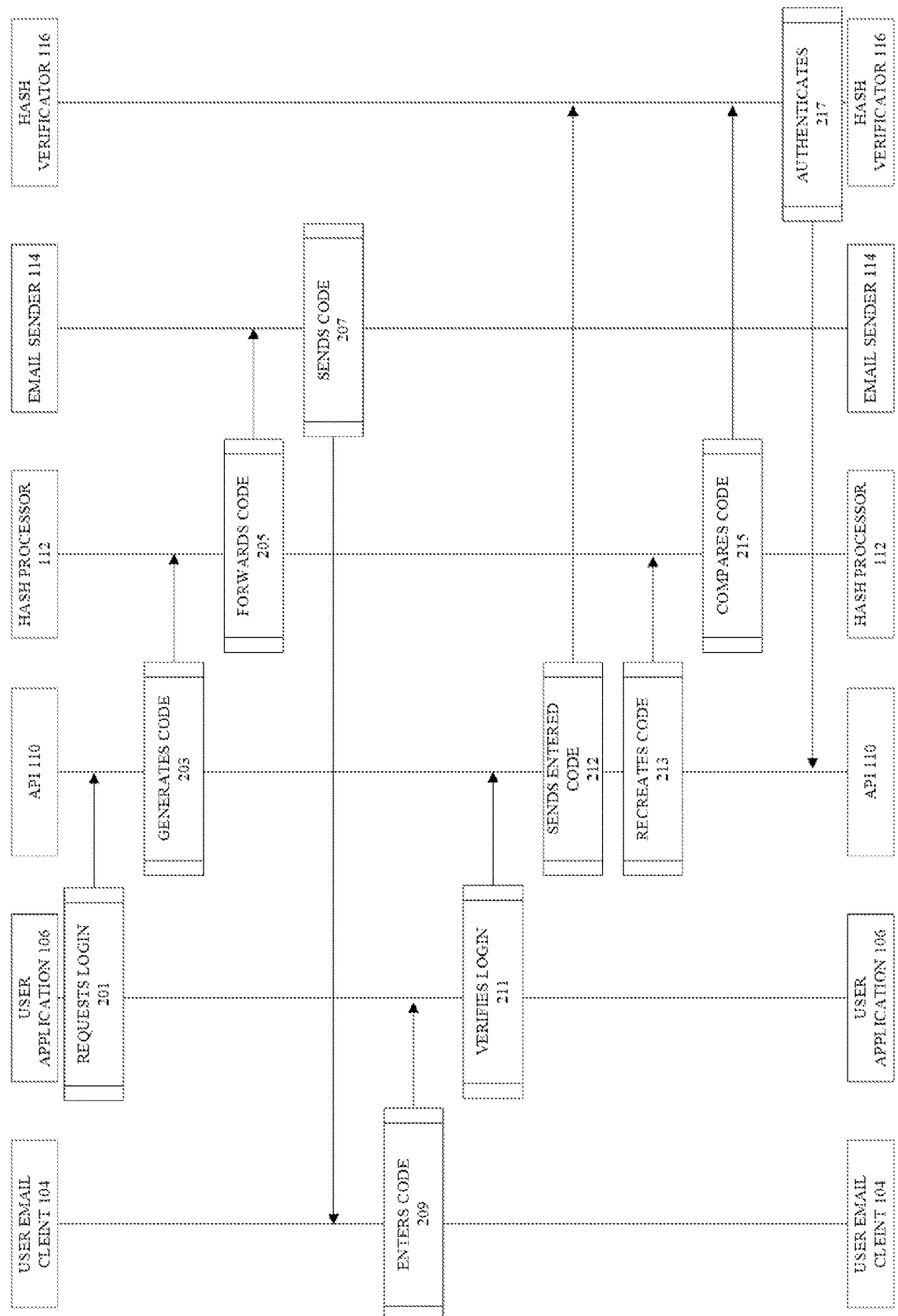
FIG. 2 shows an exemplary flow diagram of successful user authentication using validation codes without data persistence.

FIG. 2 shows an exemplary flow diagram of successful user authentication using validation codes without data persistence.

In step 201, User Application 106, present on User Device 102 sends a request for authentication to API 110, present on Service Infrastructure 108. The authentication is required to access services. User Device 102 also sends some identifying information with the authentication request, namely an email address or other unique identifier associated with an email address. This identifying information relates to the identity but not to the authenticity of a user. Upon receiving the communication from User Device 102, API 110 also marks a timestamp of that communication.

In step 203, API 110 forwards the email address or other identifying information to Hash Processor 112 to generate a hash value consisting of the email address and other unique information but at least including the timestamp.

The hash generation will depend on particular algorithms used, but in one example, the algorithm for generating a code can consist of:
Hash function—hash
Email address—e
Unix timestamp—t
Server secret—s
Authentication code length parameter—l
These values would be processed as follows to produce a validation code:
Concatenate email address (e) and timestamp (t) to yield message (m).
Compute a divisor (d) by raising 2 to the power of the size of hash in bits and subtracting 1.
Compute the numeric upper limit (u) of authentication code by raising 10 to the power of l and subtracting 1.

$$\text{Authentication code } a = (\text{hmac}(\text{hash}, m, s) * u) / d$$

This is only an exemplary algorithm to produce a safe code that is easy for a user to enter, however, other algorithms may be used within the scope and spirit of the techniques disclosed herein. In one concrete example of this algorithm, the following input information is received and produced;
sh function—SHA-3 (512 bit length)
Email address—example@example.com
Unix timestamp—1577836800
Server secret—"secret" encoded in ASCII
Authentication code length parameter—6
And the following output results are yielded:
m=example@example.com1577836800
d=2'512-1
u=0xf423f
Authentication code a=294025 (decimal)

In this particular case, Hash Processor 112 would generate a decimal validation code—294025 based on the inputs provided by API 110.

In step 205, Hash Processor 112 forwards the validation code to Email Sender 114 which formulates an email message containing the original validation code.

In step 207, Email Sender 114 sends the formulated email message, containing the original validation code, to User Email client 104 on User Device 102.

In step 209, User Application 106 is opened, and the validation code is entered. The code can be entered manually or automatically. In either case, if a correct code, i.e. same as the original validation code, is entered, it proves that User Device 102 has access to the indicated email account at the given time.

In step 211, User Application 106 sends the entered code to API 110 on Service Infrastructure 108. Upon receiving the message, API 110 records a timestamp at which the validation code was received. API 110 compares the timestamp of the received validation code to the previous timestamp of the original validation code to validate that the received validation code is not too old. The received validation code is determined to be not too old if a threshold is satisfied. The time threshold can be any time limit or time range, for example up to 100 seconds, up to 100 minutes, up to 100 hours, or between 2 seconds and 100 minutes.

In step 212, API 110 forwards the validation code entered in User Device 102 to Hash Verificator 116.

In step 213, API 110 forwards the email address and other information required to reproduce the original validation code to Hash Processor 112 which then executes the same algorithm as was used to produce the original validation code.

In step 215, Hash Processor 112 forwards the reproduced original validation code to Hash Verificator 116 which compares the reproduced original validation code to the validation code received from User Device 102.

In step 217, Hash Verificator 116 finds a match between the two validation codes and informs API 110 to authenticate User Device 102. A match is determined if the time threshold between the two validation codes is satisfied, for example, as discussed above. By this step, all verification and authentication procedures are done and none of the data required for the procedures is retained.

Figure 3:
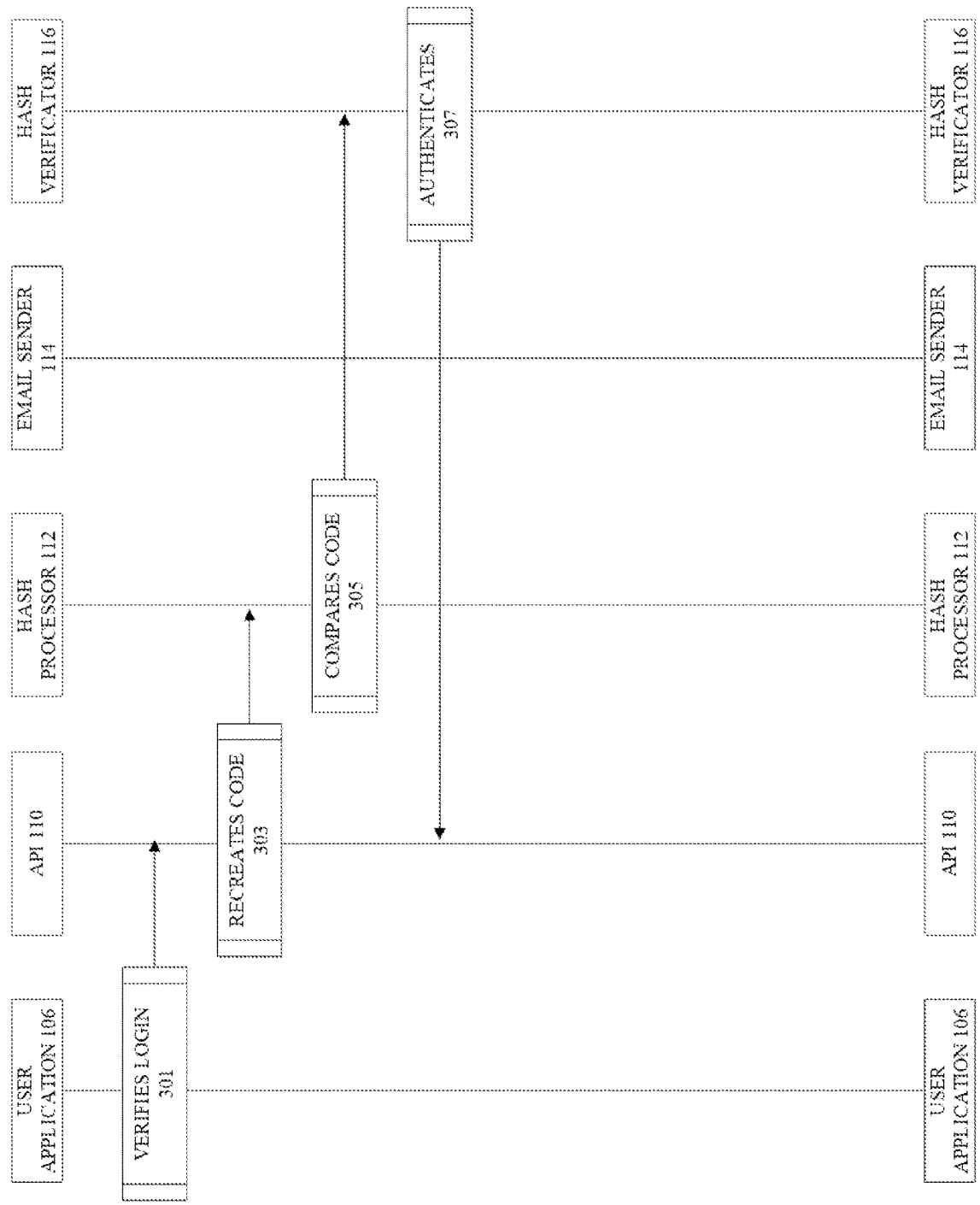
FIG. 3 shows an exemplary flow diagram of unsuccessful user authentication using validation codes without data persistence.

FIG. 3 shows an exemplary flow diagram of unsuccessful user authentication using validation codes without data persistence.

In step 301, User Device 102 sends an authentication code to API 110. In this example, the code is 111111. At the time of reception, the service provider does not know whether the code is correct or not because the implemented methods do not use data persistence. Upon receiving the message, API 110 records a timestamp at which the validation code was received. API 110 compares the timestamp to the previous timestamp to validate that the validation code is not too old.

In step 303, API 110 forwards the email address or other identifying information to Hash Processor 112 to generate a hash value consisting of the email address and other unique information but at least including the timestamp. API 110 can also include the received code for further comparison.

The hash generation will depend on particular algorithms used, but in one example, the algorithm for generating a code can consist of:
Hash function—hash
Email address—e
Unix timestamp t
Server secret—s
Authentication code length parameter—l
These values would be processed as follows to produce a validation code:
Concatenate email address (e) and timestamp (t) to yield message (m).
Compute a divisor (d) by raising 2 to the power of the size of hash in bits and subtracting 1.
Compute the numeric upper limit (u) of authentication code by raising 10 to the power of l and subtracting 1, $$\text{Authentication code } a = (\text{hmac}(\text{hash}, m, s) * u) / d$$

This is only an exemplary algorithm to produce a safe code that is easy for a user to enter, however, other algorithms may be used within the scope and spirit of the techniques disclosed herein. In one concrete example of this algorithm, the following input information is received and produced:
 sh function—SHA-3 (512 bit length)
 Email address—example @example.com
 Unix timestamp—1577836800
 Server secret—"secret" encoded in ASCII
 Authentication code length parameter—6
 And the following output results are yielded:
 m=example@example.com1577836800
 d=2'512-1
 u=0xf423f
 Authentication code a=294025 (decimal)

In this particular case, Hash Processor 112 would generate a decimal validation code—294025 based on the inputs provided by API 110.

In step 305, Hash Processor 112 forwards the reproduced validation code to Hash Verificator 116 which compares the original validation code to the validation code received from User Device 102.

In step 307, Hash Verificator 116 does not find a match between the two validation codes and informs API 110 to not authenticate User Device 102. By this step, all verification and authentication procedures are stopped and none of the data required for the procedures is retained.

Some embodiments can use Hardware IDs as identifiers. Hardware IDs include but are not limited to hardware product IDs, serial numbers, and similar hardware related information. Hardware IDs are of two varieties. The first includes serial numbers assigned to every computer component produced. However, these are not unique and only signify the manufacturer, date, and model of a component. Yet there is another type of Hardware ID (sometimes referred to as a computer hardware ID or CHID) that is uniquely generated every time that a computer boots up. Additionally, some versions of Hardware ID include an SKU (Stock Keeping Unit) number that uniquely identifies a piece of hardware.

Other embodiments can use different hardware related unique IDs like product_uuid or cpu_uuid. Those values are generated in kernel code. A UUID (universally unique identifier) in general is an identifier that is designed to be unique across both time and space. It requires no central registration process. The QUID is 128 bits long. UUIDs often use the following components or any unique combination thereof: low field of the timestamp, middle field of the timestamp, high field of the timestamp multiplexed with the version number, high field of the clock sequence multiplexed with the variant, low field of the clock sequence, spatially unique node identifier.

In addition to hardware IDs, the current embodiments can also use Software Generated IDs. Software Generated IDs are unique strings that are generated by any kind of software either on Service Infrastructure 108 or User Device 102. One example of a software generated ID is a hash containing a unique machine ID of the local system that is set during installation or boot. The machine ID is a single newline-terminated, hexadecimal, 32-character, lowercase ID. When decoded from hexadecimal, this corresponds to a 16-byte/128-bit value. This ID cannot be all zeros. The machine ID is usually generated from a random source during system installation or first boot and stays constant for all subsequent boots. Optionally, for stateless systems, it is generated during runtime during early boot if necessary. The machine ID may be set, for example when network booting. Similarly, a boot ID could be used which is the message generated and formatted as a 128-bit hexadecimal string during boot.

Another unique software feature that can be used in some embodiments to produce a unique hash involved network connectivity information, like a hostname which is a label that is assigned to a device connected to a computer network and that is used to identify the device in various forms of electronic communication. Hostnames may be simple names consisting of a single word or phrase, or they may be structured. A hostname is a unique name for a computer or network node in a network. They can describe both physical addresses and network nodes, which have multiple domains under one host.

Another example of a unique identifier generated based on network information is HostID which is the physical hardware number of the Ethernet Network Interface Card (MC). The HostID is sometimes called Ethernet address or MAC-address (Media Access Control address), Host ID is a specific piece of information which uniquely identifies a computer.

These groups of identifiers—Hardware IDs, Software IDs, and Network IDs can be added to the validation code generating algorithm to improve the identification of User Device 102. In such cases, the identifiers would be added to the algorithm before hashing and then used to produce a validation code. Then, if the validation code is sent from a device without the same identifier, the validation code will be different from the original and the authentication will fail.

Figure 4:
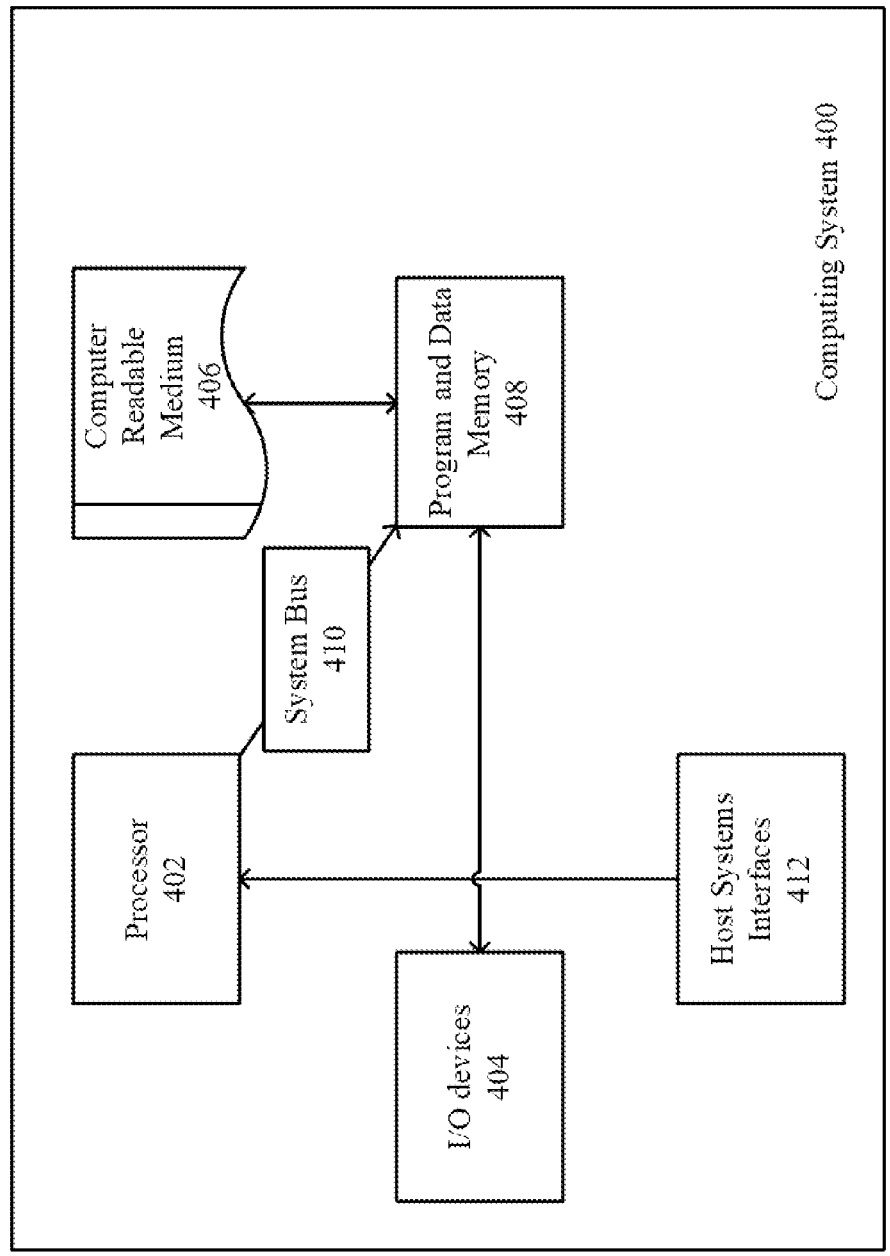
FIG. 4 shows a computing system in which a computer readable medium may provide instructions for performing any of the methods and processes disclosed herein.

The embodiments herein may be combined in a variety of ways as a matter of design choice. Accordingly, the features and aspects herein are not intended to be limited to any particular embodiment. Furthermore, the embodiments can take the form of hardware, firmware, software, and/or combinations thereof. In one embodiment, such software includes but is not limited to firmware, resident software, microcode, etc. FIG. 4 illustrates a computing system 400 in which a computer readable medium 406 may provide instructions for performing any of the methods and processes disclosed herein.

Furthermore, some aspects of the embodiments herein can take the form of a computer program product accessible from the computer readable medium 406 to provide program code for use by or in connection with a computer or any instruction execution system. For the purposes of this description, the computer readable medium 406 can be any apparatus that can tangibly store the program code for use by or in connection with the instruction execution system, apparatus, or device, including the computing system 400.

The computer readable medium 406 can be any tangible electronic, magnetic, optical, electromagnetic, infrared, or semiconductor system (or apparatus or device). Some examples of a computer readable medium 406 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-RAN), and digital versatile disks (DVD).

The computing system 400 can include one or more processors 402 coupled directly or indirectly to memory 408 through a system bus 410. The memory 408 can include local memory employed during actual execution of the program code, bulk storage, and/or cache memories, which provide temporary storage of at least some of the program code in order to reduce the number of times the code is retrieved from bulk storage during execution.

Input/output (I/O) devices 404 (including but not limited to keyboards, displays, pointing devices, I/O interfaces, etc.) can be coupled to the computing system 400 either directly or through intervening I/O controllers. Network adapters may also be coupled to the computing system 400 to enable the computing system 400 to couple to other data processing systems, such as through host systems interfaces 412, printers, and/or storage devices through intervening private or public networks. Modems, cable modems, and Ethernet cards are just examples of network adapter types.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as a critical, required, or essential feature or element of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "Exit Nodes Database", or similar), that contains a collection of information that is organized so that it can be easily accessed, managed and updated. Computer databases typically contain aggregations of data records or files, in the current case, databases usually store different information and statistics about the proxies or exit nodes, information about utilization threshold of the exit node provider. Such databases can also contain information about the users, requests performed, networks used, exit nodes used, types of exit nodes requested and similar data. Databases are structured to facilitate the storage, retrieval, modification, and deletion of data in conjunction with various data-processing operations.

The Disclosure is provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment.

The invention claimed is:

1. A method for authenticating a user device at a service provider server, the method comprising:
    receiving, at the service provider server, from the user device, an identifier and a first timestamp, wherein the user device is remote to the service provider server;
    validating, at the service provider server, the first timestamp;
    generating, at the service provider server, a first validation code;
    sending, from the service provider server, the first validation code to the user device;
    receiving, at the service provider server from the user device, the first validation code and the first timestamp to the user device;
    validating, at the service provider server, the first timestamp;
    generating, at the service provider server, the second validation code by same procedure as used to generate the first validation code;
    comparing, at the service provider server, the first validation code and the second validation code; and
    authenticating, at the service provider server, the user device, if the first validation code and the second validation code are a match within a predefined time threshold,
    wherein the user device comprises at least two distinct devices, at least one of which authenticates with the service provider server and the other is used to open an email message.

2. The method of claim 1, wherein the match of the first validation code and the second validation code results in the authentication of the user device.

3. The method of claim 1, wherein the first validation code consists of at least one hash function and at least one cryptographic server secret.

4. The method of claim 1, wherein the generation of the first validation code includes a numeric upper limit.

5. The method of claim 1, wherein a failed match of the first validation code and the second validation code results in the failed authentication of the user device.

6. The method of claim 1, wherein the identifier includes at least one of the following:
    an email address,
    a Hardware ID,
    a Software Generated ID, or
    a Network ID.

7. An apparatus for authenticating a user device, at a service provider server, the apparatus comprising the service provider server, the service provider server comprising:
 a least one processor; and
 a memory communicably coupled to the at least one processor, the memory comprising computer-executable instructions, which when executed by the at least one processor perform a method comprising:
  receiving, at the service provider server, from the user device, an identifier and a first timestamp, wherein the user device is remote to the service provider server,
  validating, at the service provider server, the first timestamp,
  generating, at the service provider server, a first validation code,
  sending, from the service provider server, the first validation code to the user device,
  receiving, at the service provider server from the user device, the first validation code and the first timestamp to the user device,
  validating, at the service provider server, the first timestamp,
  generating, at the service provider server, the second validation code by same procedure as used to generate the first validation code,
  comparing, at the service provider server, the first validation code and the second validation code, and
  authenticating, at the service provider server, the user device, if the first validation code and the second validation code are a match within a predefined time threshold,
  wherein the user device comprises at least two distinct devices, at least one of which authenticates with the service provider server and the other is used to open an email message.

8. The apparatus of claim 7, wherein the match of the first validation code and the second validation code results in the authentication of the user device.

9. The apparatus of claim 7, wherein the first validation code consists of at least one hash function and at least one cryptographic server secret.

10. The apparatus of claim 7, wherein the generation of the first validation code includes a numeric upper limit.

11. The apparatus of claim 7, wherein a failed match of the first validation code and the second validation code results in the failed authentication of the user device.

12. The apparatus of claim 7, wherein the identifier includes at least one of the following:
 an email address,
 a Hardware ID,
 a Software Generated ID, or
 a Network ID.

13. An non-transitory computer readable storage medium comprising computer-executable instructions, which when executed by at least one processor, are configured to perform a method comprising:
 receiving, at the service provider server, from the user device, an identifier and a first timestamp, wherein the user device is remote to the service provider server;
 validating, at the service provider server, the first timestamp;
 generating, at the service provider server, a first validation code;
 sending, from the service provider server, the first validation code to the user device;
 receiving, at the service provider server from the user device, the first validation code and the first timestamp to the user device;
 validating, at the service provider server, the first timestamp;
 generating, at the service provider server, the second validation code by same procedure as used to generate the first validation code,
 comparing, at the service provider server, the first validation code and the second validation code, and
 authenticating, at the service provider server, the user device, if the first validation code and the second validation code are a match within a predefined time threshold,
 wherein the user device comprises at least two distinct devices, at least one of which authenticates with the service provider server and the other is used to open an email message.

14. The non-transitory computer readable storage medium of claim 13, wherein the match of the first validation code and the second validation code results in the authentication of the user device.

15. The non-transitory computer readable storage medium of claim 13, wherein the first validation code consists of at least one hash function and at least one cryptographic server secret.

16. The non-transitory computer readable storage medium of claim 13, wherein a failed match of the first validation code and the second validation code results in the failed authentication of the user device.

17. The non-transitory computer readable storage medium of claim 13, wherein the identifier includes at least one of the following:
 an email address,
 a Hardware ID,
 a Software Generated ID, or
 a Network ID.

* * * * *